United States Patent
Liao et al.

(10) Patent No.: US 8,548,082 B2
(45) Date of Patent: Oct. 1, 2013

(54) CONTENTION-BASED ACCESS CHANNEL DESIGN IN MIMO OFDM/OFDMA SYSTEMS

(75) Inventors: Pei-Kai Liao, Mingjian Xiang (TW); Chih-Yuan Lin, Wujie Township, Yilan County (TW); Yih-Shen Chen, Hsinchu (TW)

(73) Assignee: Mediatek Inc. (TW)

( * ) Notice: Subject to any disclaimer, the term of this patent is extended or adjusted under 35 U.S.C. 154(b) by 787 days.

(21) Appl. No.: 12/589,449

(22) Filed: Oct. 23, 2009

(65) Prior Publication Data
US 2010/0104036 A1 Apr. 29, 2010

Related U.S. Application Data

(60) Provisional application No. 61/108,086, filed on Oct. 24, 2008.

(51) Int. Cl.
*H04B 7/02* (2006.01)
(52) U.S. Cl.
USPC .......................................................... 375/267
(58) Field of Classification Search
USPC ................. 375/259–260, 295–296, 299, 316, 375/347; 370/203–204, 208, 281, 295, 302, 370/343, 436, 478, 480–481; 455/456.5, 455/455.6
See application file for complete search history.

(56) References Cited

U.S. PATENT DOCUMENTS

| 2008/0159430 | A1* | 7/2008 | Steer et al. ..................... 375/267 |
| 2008/0227495 | A1* | 9/2008 | Kotecha et al. ............ 455/562.1 |
| 2008/0232401 | A1 | 9/2008 | Ahmadi et al. ............... 370/469 |
| 2008/0285670 | A1* | 11/2008 | Walton et al. ................. 375/260 |
| 2008/0298315 | A1 | 12/2008 | Ihm et al. ...................... 370/329 |
| 2009/0119773 | A1* | 5/2009 | D'Amore et al. ............... 726/21 |
| 2009/0285325 | A1 | 11/2009 | Zhou ............................. 375/267 |
| 2012/0063409 | A1* | 3/2012 | Novak et al. .................. 370/330 |
| 2012/0140664 | A1* | 6/2012 | Walton et al. ................. 370/252 |

FOREIGN PATENT DOCUMENTS

| WO | WO2007133652 | 11/2007 |
| WO | WO2008082908 | 7/2008 |

OTHER PUBLICATIONS

Yuan Zhu et al., "Quick Access Channel (QACH) Design for IEEE 802.16m BW-REQ," IEEE C802.16m-08/1055r2, Sep. 17, 2008.
International Search Report and Written Opinion of International Search Authority for PCT/CN2009/074597 dated Feb. 4, 2010 (12 pages).
JPOA for Japanese Patent application 2011-531340 dated Aug. 22, 2012 (8 pages).

* cited by examiner

*Primary Examiner* — Don N Vo
(74) *Attorney, Agent, or Firm* — Imperium Patent Works; Zheng Jin (57) ABSTRACT

A contention-based multi-antenna access request transmission/receiving procedure in MIMO OFDM/OFDMA systems is provided to reduce access latency. A mobile station encodes and transmits an access request over a shared access channel using multiple transmitting antennas, while a base station receives and decodes a number of access requests using multiple receiving antennas. Each access request comprises an access indictor and an access message. In a first MIMO scheme, the mobile station transmits the access indicator as preambles, while the access message is encoded by SFBC/STBC to obtain spatial diversity. At the receive side, the access indicator is exploited as pilots for channel estimation. The access message is decoded using SFBC/STBC decoding algorithm. In a second MIMO scheme, the mobile station performs precoding/beamforming for each of the transmitting antenna to obtain beamforming gain, while the base station performs virtual beam matching based on the detection results of the access indicators.

20 Claims, 10 Drawing Sheets

METHOD OF TRANSMITTING AN ACCESS REQUEST WITH MEASURED CSI IN A CELLULAR OFDM/OFDMA SYSTEM

TABLE 756 - UPLINK MIMO MODES

| MODE INDEX | DESCRIPTION | MIMO ENCODING | MIMO PRECODING |
|---|---|---|---|
| MODE 0 | OL SU-MIMO | SFBC | NON-ADAPTIVE |
| MODE 1 | OL SU-MIMO (SM) | VE | NON-ADAPTIVE |
| MODE 2 | CL SU-MIMO (SM) | VE | ADAPTIVE |
| MODE 3 | OL MU-MIMO (SM) | VE | NON-ADAPTIVE |
| MODE 4 | CL MU-MIMO (SM) | VE | ADAPTIVE |

TABLE 757 - UPLINK MIMO PARAMETERS

| | NT | R | MT | NF | L |
|---|---|---|---|---|---|
| MIMO MODE 0 | 2 | 1 | 2 | 2 | 1 |
| | 4 | 1 | 2 | 2 | 1 |
| MIMO MODE 1 AND MIMO MODE 2 | 1 | 1 | 1 | 1 | 1 |
| | 2 | 1 | 1 | 1 | 1 |
| | 2 | 2 | 2 | 1 | 1 |
| | 4 | 1 | 1 | 1 | 1 |
| | 4 | 2 | 2 | 1 | 1 |
| | 4 | 3 | 3 | 1 | 1 |
| | 4 | 4 | 4 | 1 | 1 |
| MIMO MODE 3 AND MIMO MODE 4 | 1 | 1 | 1 | 1 | 1 |
| | 2 | 1 | 1 | 1 | 1 |
| | 2 | 2 | 2 | 1 | 1 |
| | 4 | 1 | 1 | 1 | 1 |
| | 4 | 2 | 2 | 1 | 1 |
| | 4 | 3 | 3 | 1 | 1 |

CONTENTION-BASED ACCESS CHANNEL DESIGN IN MIMO OFDM/OFDMA SYSTEMS

CROSS REFERENCE TO RELATED APPLICATIONS

This application claims priority under 35 U.S.C. §119 from U.S. Provisional Application No. 61/108,086, entitled "Contention-based Access Channel Designs with MIMO Support for OFDM/OFDMA Systems," filed on Oct. 24, 2008, the subject matter of which is incorporated herein by reference.

TECHNICAL FIELD

The disclosed embodiments relate generally to wireless network communications, and, more particularly, to contention-based access channel design in multiple-input multiple-output (MIMO) orthogonal frequency division multiplexing (OFDM) or orthogonal frequency division multiple access (OFDMA) systems.

BACKGROUND

In cellular systems such as orthogonal frequency division multiplexing (OFDM) or orthogonal frequency division multiple access (OFDMA) wireless systems, an access channel is commonly used for a mobile station (MS) to request access and acquire ownership of an uplink data channel in order to initiate transmission with a base station (BS). In current design of IEEE 802.16e, there are four types of access channels for the MS to send an access request: an initial ranging channel, a handover (HO) ranging channel, a bandwidth request (BW-REQ) ranging channel, and a periodic ranging channel. An access request procedure usually consists of two phases: a contention resolution phase and a request negotiation phase. Take an IEEE 802.16e BW-REQ ranging procedure as an example, in the first phase, the MS sends a BW-REQ ranging code via a shared channel, and the BS acknowledges after detecting which mobile station sends the BW-REQ ranging code. In the second phase, the MS sends a BW-REQ message for bandwidth allocation, and the BS grants uplink resource after correctly decoding the BW-REQ message. After successful contention and negotiation in both phases, the MS is then able to start scheduled uplink transmission. Therefore, it takes five steps and is quite time-consuming to complete the entire BW-REQ ranging procedure.

Figure 1:
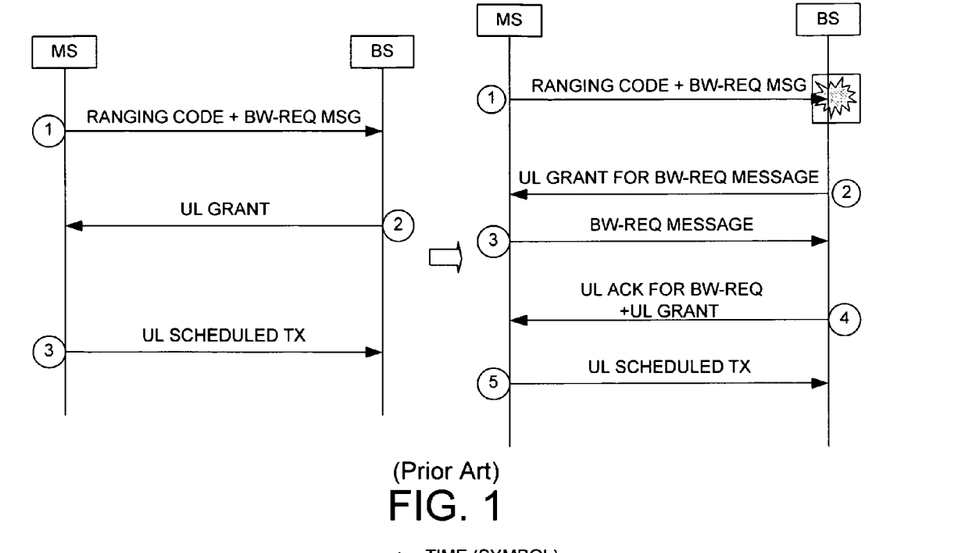
FIG. 1 (Prior Art) illustrates sequence charts of a 3-step bandwidth request ranging procedure and a 5-step bandwidth request ranging procedure.

FIG. 1 (Prior Art) illustrates sequence charts of a 3-step BW-REQ ranging procedure and a fallback 5-step BW-REQ ranging procedure. In a 3-step BW-REQ ranging procedure illustrated in the left side of FIG. 1, the MS first sends a BW-REQ ranging code with an embedded BW-REQ message. The BS detects the BW-REQ ranging code, decodes the BW-REQ message, and grants uplink resource. The MS then starts scheduled uplink data transmission. By sending the BW-REQ ranging code and the BW-REQ message together, BW-REQ ranging latency is shortened. This 3-step BW-REQ ranging procedure, however, falls back to a 5-step BW-REQ ranging procedure when ranging collision occurs. As illustrated in the right side of FIG. 1, the MS first sends a BW-REQ ranging code with an embedded BW-REQ message. Due to multiple ranging transmission from multiple mobile stations (i.e., multiple mobile stations send BW-REQ with different BW-REQ ranging codes and messages at the same time), the BW-REQ messages may not be decodable by the BS while the BW-REQ ranging codes are decodable. This is because BW-REQ ranging code is usually more robust than BW-REQ message in the BW-REQ ranging design. As a result, the MS retransmits the BW-REQ message to the BS. The BS decodes the BW-REQ message successfully and grants uplink resource. Finally, the MS is able to start scheduled uplink data transmission. Therefore, in the fallback 5-step BW-REQ ranging procedure, the access latency is not reduced.

Figure 2:
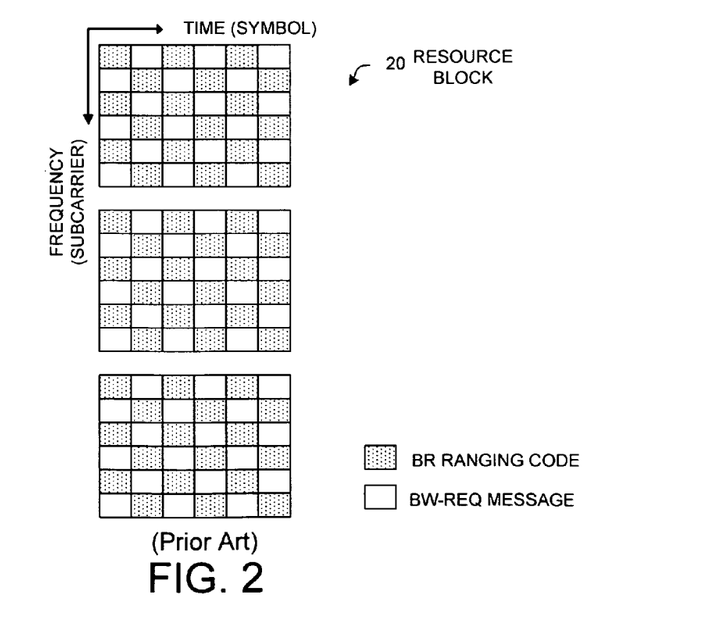
FIG. 2 (Prior Art) illustrates a physical layer channel structure of a resource block used for access channel transmission.

FIG. 2 (Prior Art) illustrates a physical (PHY) layer channel structure of a resource block 20 used for BW-REQ ranging channel transmission. Resource block 20 is a two-dimensional 18×6 BW-REQ channel, allocated into three distributed 6×6 BW-REQ tiles. Each BW-REQ tile comprises six time slots (OFDM symbol) in the time domain and six frequency tones (subcarrier) in the frequency domain. In the example of FIG. 2, to facilitate the 3-step BW-REQ ranging procedure illustrated in FIG. 1, the BW-REQ ranging code is robustly designed as preambles for reliable non-coherent detection, while the BW-REQ message is less robust for coherent detection.

Although the 3-step BR ranging procedure illustrated in FIG. 1 and the PHY layer BW-REQ channel structure illustrated in FIG. 2 are designed to shorten access latency, such design is based on single-antenna MS operation. Therefore, the design does not exploit transmission gains of multiple antennas such as diversity gain and beamforming gain that can be achieved by multiple-input multiple-output (MIMO) techniques. As a result, due to the large performance gap between BW-REQ ranging code and BW-REQ message, the design may face high probability of falling back to 5-step BW-REQ ranging procedure and thus results in no latency improvement and the waste of radio resources in BW-REQ message. For example, if multiple MSs transmit BW-REQ with different BW-REQ ranging codes and messages to the BS at the same time, then some or all the MSs may have to retransmit their BW-REQ messages and fall back to 5-step BW-REQ ranging procedure because the BS may not be able to decode some or any of the BW-REQ messages successfully. A solution is sought for further performance improvement.

SUMMARY

A contention-based multi-antenna channel access transmission in MIMO OFDM/OFDMA systems is provided. At the transmit side, a mobile station encodes and transmits an access request over a shared access channel using multiple transmitting antennas. At the receive side, a base station receives and decodes a number of access requests using multiple receiving antennas. Each access request comprises an access indictor and an access message, which is transmitted over the access channel using a shared resource block. In a mixed PHY layer channel structure, the access indicator and the access message are mixed together physically within the resource block. In a separate PHY layer channel structure, the access indicator and the access message are allocated in separate regions physically within the resource block. There are two different MIMO schemes in supporting a multi-antenna access request procedure, during which transmission gain of multiple antennas is exploited, decoding performance is improved, and access latency is reduced.

In a first MIMO scheme, the mobile station applies Space Frequency Block Coding (SFBC) and/or Space Time Block Coding (STBC) encoding algorithm on an access request to be transmitted using multiple transmitting antennas, while the base station decodes the access request using SFBC/STBC decoding algorithm. At the transmit side, the access indicator is encoded using orthogonal, or quasi-orthogonal, or spreading code sequences and transmitted as preambles, while the access message is encoded by SFBC/STBC encoding algorithm to obtain spatial diversity. At the receive side, the base station first performs channel estimation by exploiting the detected access indicator as pilots. The base station then decodes the access message using SFBC/STBC decoding algorithm.

In a second MIMO scheme, the mobile station transmits an access request by applying a corresponding precoding/beamforming weight for each transmitting antenna to obtain beamforming gain, while the base station decodes the access request based on virtual beam searching using multiple receiving antennas. At the transmit side, the mobile station chooses a precoding/beamforming weight purely randomly, or based on some predefined criteria, or based on Channel State Information (CSI) measured by the mobile station. At the receive side, the base station first performs virtual beam matching based on the detection results of the access indicators. The base station then decodes each access message by the best vector weight for each detected access indicator.

Other embodiments and advantages are described in the detailed description below. This summary does not purport to define the invention. The invention is defined by the claims.

BRIEF DESCRIPTION OF THE DRAWINGS

The accompanying drawings, where like numerals indicate like components, illustrate embodiments of the invention.

DETAILED DESCRIPTION

Reference will now be made in detail to some embodiments of the invention, examples of which are illustrated in the accompanying drawings.

Figure 3:
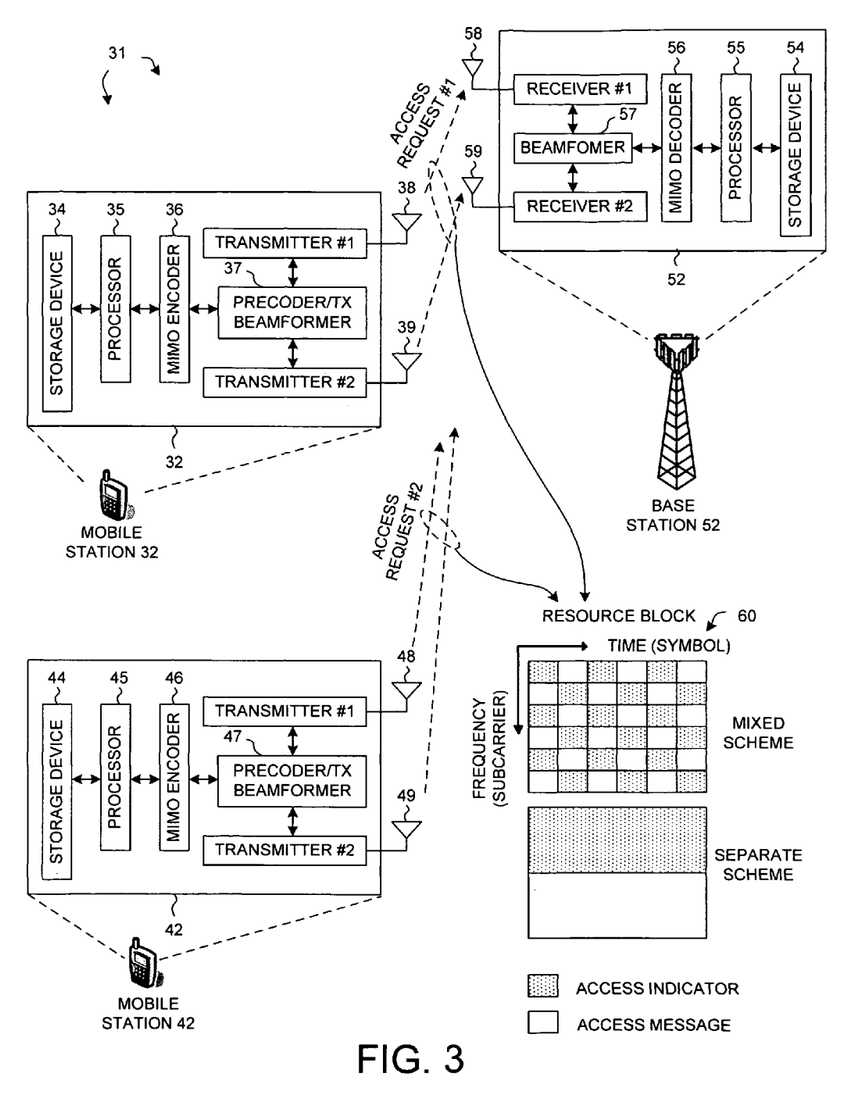
FIG. 3 is a simplified block diagram of a cellular OFDM/OFDMA system in accordance with one novel aspect.

FIG. 3 is a simplified block diagram of a cellular MIMO OFDM/OFDMA system 31 for access channel transmission in accordance with one novel aspect. Cellular MIMO OFDM/OFDMA system 31 comprises a first mobile station MS32, a second mobile station MS42, and a base station BS52. On the transmit side, MS32 comprises a storage device 34, a processor 35, a multiple-input multiple-output (MIMO) encoder 36, a precoding/beamforming module 37, a first transmitter #1 coupled to antenna 38, and a second transmitter #2 coupled to antenna 39. Similarly, MS42 comprises a storage device 44, a processor 45, a MIMO encoder 46, a precoding/beamforming module 47, a first transmitter #1 coupled to antenna 48, and a second transmitter #2 coupled to antenna 49. On the receive side, BS41 comprises a storage device 54, a processor 55, a MIMO decoder 56, a beamforming module 57, a first receiver #1 coupled to antenna 58, and a second receiver #2 coupled to antenna 59.

Before a mobile station initiates uplink data transmission with a base station, the mobile station is required to acquire ownership of an uplink data channel by sending an access request via a contention-based access channel. In current design of IEEE 802.16e, there are four types of access channel for sending an access request: an initial ranging channel, a handover (HO) ranging channel, a bandwidth request (BW-REQ) ranging channel, and a periodic ranging channel. An access request procedure normally consists of two phases: a contention resolution phase and a request negotiation phase. During the contention resolution phase, the mobile station sends an access indicator over the access channel and the base station detects the access indicator and acknowledges which mobile station sends the access request. During the request negotiation phase, the mobile station sends an access message with request content and negotiates with the base station for uplink resource allocation. To reduce access latency, it is often desirable to combine the contention resolution phase with the request negotiation phase. In other words, the mobile station sends an access request that comprises both access indicator and access message to the base station to achieve fast access.

In the example of FIG. 3, MS32 sends an access request #1 to BS52 over an access channel, while MS42 sends an access request #2 to BS52 over the shared access channel. In one novel aspect, mobile stations MS32 and MS42 utilize multiple transmitting antennas to encode and transmit their access requests over the shared access channel in MIMO OFDM/OFDMA system 31. In addition, base station BS52 utilizes multiple receiving antennas to receive and decode the access requests. With more details described below, by utilizing multiple antennas at both the transmit side and the receive side for access channel transmission, decoding performance is improved and access latency is reduced as compared to legacy access request procedures using a single-antenna access channel transmission scheme.

To facilitate a multi-antenna access request procedure, each access request is transmitted over the access channel using a shared resource block 60. As illustrated in FIG. 3, resource block 60 is a two-dimensional access channel, comprising an array of time slots (OFDM symbols) in the time domain and an array of frequency tones (subcarriers) in the frequency domain. Within resource block 60, there are two possible schemes of physical (PHY) layer channel structure. In a mixed scheme, access indicator and access message are partitioned and mixed together physically. In a separate scheme, access indicator and access message are allocated in separate regions physically.

There are two different MIMO schemes to support a multi-antenna access request procedure. The main idea behind of these two schemes is to improve the decoding performance of access messages to achieve the following one or two purposes. First, the performance gap between access indicator and access messages (usually, access indicator is more robust than access message) can be reduced. Second, the decoding performance of both access indicator and access message is enhanced. With this performance enhancement, the average latency of the access request is improved. In a first MIMO scheme, the mobile station applies Space Frequency Block Coding (SFBC) and/or Space Time Block Coding (STBC) encoding on an access request to be transmitted using multiple transmitting antennas, while the base station decodes the access request using SFBC/STBC decoding algorithm. In a second MIMO scheme, the mobile station sends an access request by applying a corresponding precoding/beamforming weight for each transmitting antenna, while the base station decodes the access request based on virtual beam searching using multiple receiving antennas. The concept and operation flow of each MIMO scheme is described below with more details.

Figure 4:
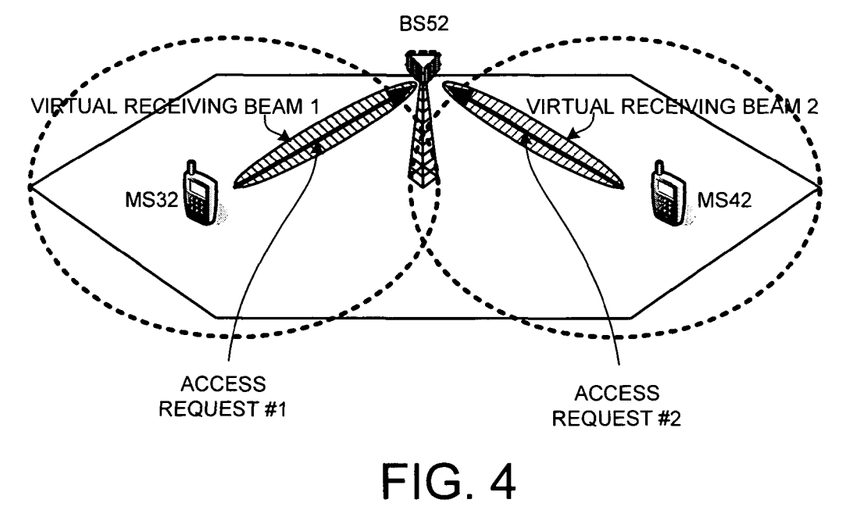
FIG. 4 illustrates a first MIMO scheme used in a multi-antenna access request procedure.

FIG. 4 illustrates the basic concept of the first MIMO scheme used in a multi-antenna access request procedure with SFBC/STBC encoding and decoding. SFBC/STBC is a diversity scheme employed to achieve spatial diversity using multiple transmitting antennas. In the example of FIG. 4, a single data stream carrying access request #1 or #2 is replicated and transmitted by MS32 or MS42 over multiple antennas respectively. More specifically, the access indicator is encoded using orthogonal, or quasi-orthogonal, or spreading code sequences, while the access message is encoded by SFBC/STBC encoding algorithm. Under such encoding scheme, each transmitted signal is orthogonal to the rest, thereby reducing self-interference and improving the capability of the receiver to distinguish between the multiple signals. Therefore, when BS52 receives multiple transmissions of the encoded data stream carrying access request #1 or #2, there is increased opportunity for BS52 to identify a strong signal due to spatial diversity gain. In the example of FIG. 4, the access indicator is exploited as an indication for BS52 to determine which virtual receiving beam (i.e., virtual receiving beams #1 and #2) is the best for MS32 and MS42 to decode its corresponding access message.

Figure 5:
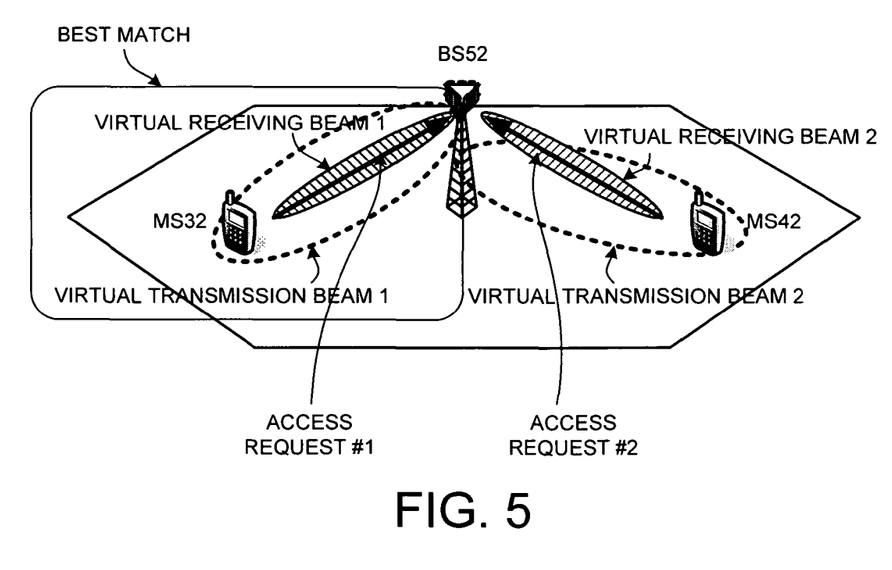
FIG. 5 illustrates a second MIMO scheme used in a multi-antenna access request procedure.

FIG. 5 illustrates the basic concept of the second MIMO scheme used in an access request procedure with precoding/beamforming. Precoding/beamforming is a signal processing technique that leverages arrays of transmitting and receiving antennas for directional signal transmission and reception. In the example of FIG. 5, a signal carrying access request #1 or #2 is applied with appropriate weighting at the transmit side for each transmitting antenna of MS32 or MS42 such that the signal power is maximized at the receiver side. When transmitting the signal, MS32 or MS42 performs transmit beamforming (i.e., by creating virtual transmission beams #1 and #2), and thus increases the power in the direction the signal is to be sent. When receiving the signal, BS52 performs receive beamforming (i.e., by matching virtual receiving beams #1 and #2 with virtual transmission beams #1 and #2), and thus increase the receiver sensitivity in the direction of the desired signals and decrease the sensitivity in the direction of interference and noise. Therefore, by applying precoding/beamforming at both transmit side and receive side utilizing multiple transmitting and receiving antennas, there is increased opportunity for BS52 to achieve beamforming gain and find a best match. In the example of FIG. 5, virtual receiving beam #1 and virtual transmission beam #1 form the best match for BS52 to decode access request #1.

Figure 6:
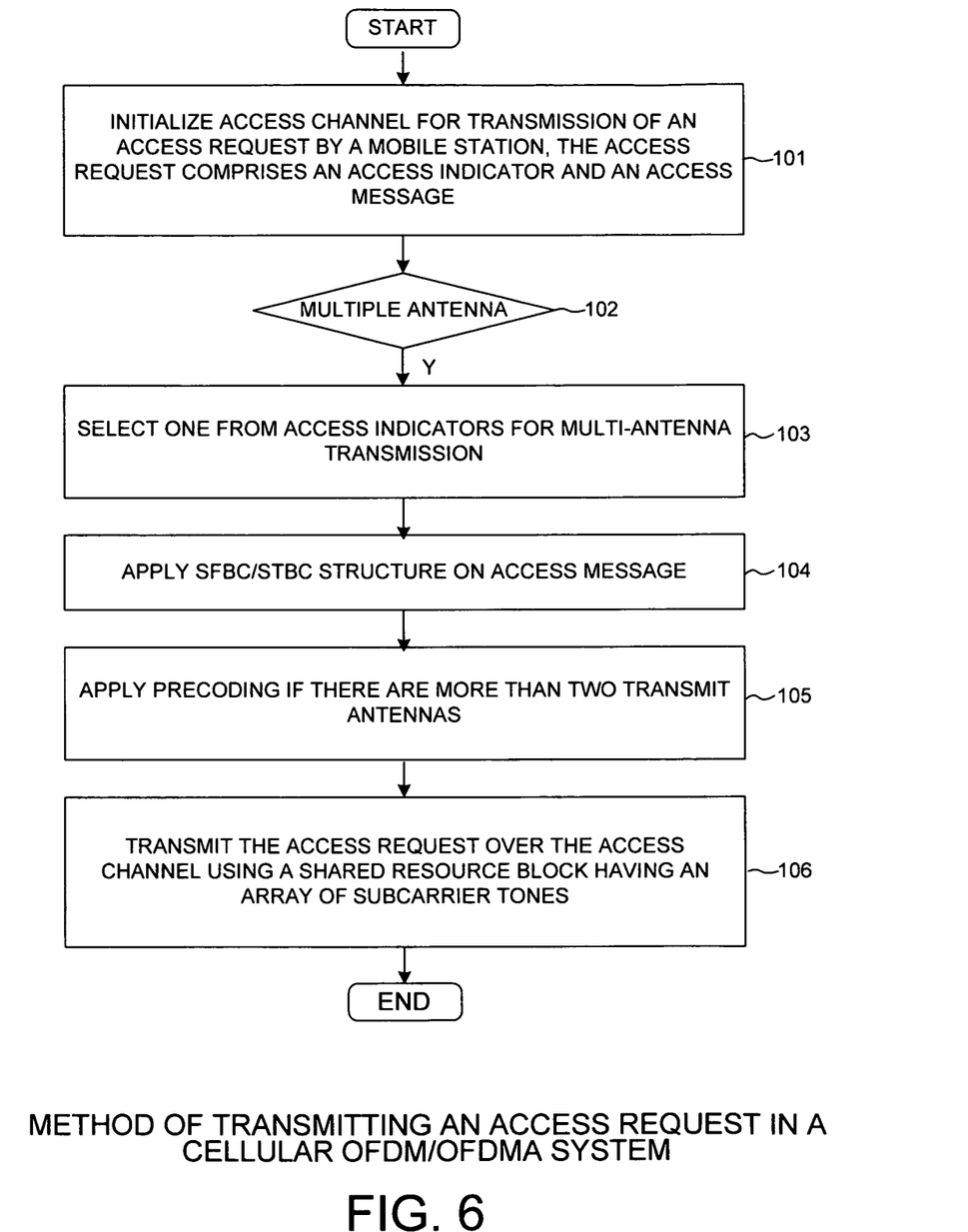
FIG. 6 is a flow chart of a first MIMO scheme in transmitting an access request by a mobile station using multiple antennas with SFBC/STBC encoding.

FIG. 6 is a flow chart of the first MIMO scheme of transmitting an access request by a mobile station using multiple antennas with SFBC/STBC encoding. The mobile station first initializes an access channel for transmitting an access request (step 101). The access request comprises an access indicator (i.e., a BR ranging code) and an access message (i.e., a BW-REQ message). When multiple antennas are used for transmission (step 102), the access indicator is chosen from a first group of access indicators for multi-antenna transmission (step 103). On the other hand, when single antenna is used for transmission, the access indicator is chosen from a second group of access indicators for single-antenna transmission. The mobile station then applies SFBC/STBC on the access message if two transmitting antennas are used (step 104). If more than two transmitting antennas are used, then higher rank SFBC/STBC encoding may be used. In addition, Double Space Time Transit Diversity (D-STTD) or random beamforming may be used to extend two-layer SFBC/STBC encoding (step 105). Finally, the mobile station transmits the encoded access request over the initialized access channel using multiple antennas (step 106).

Figure 7:
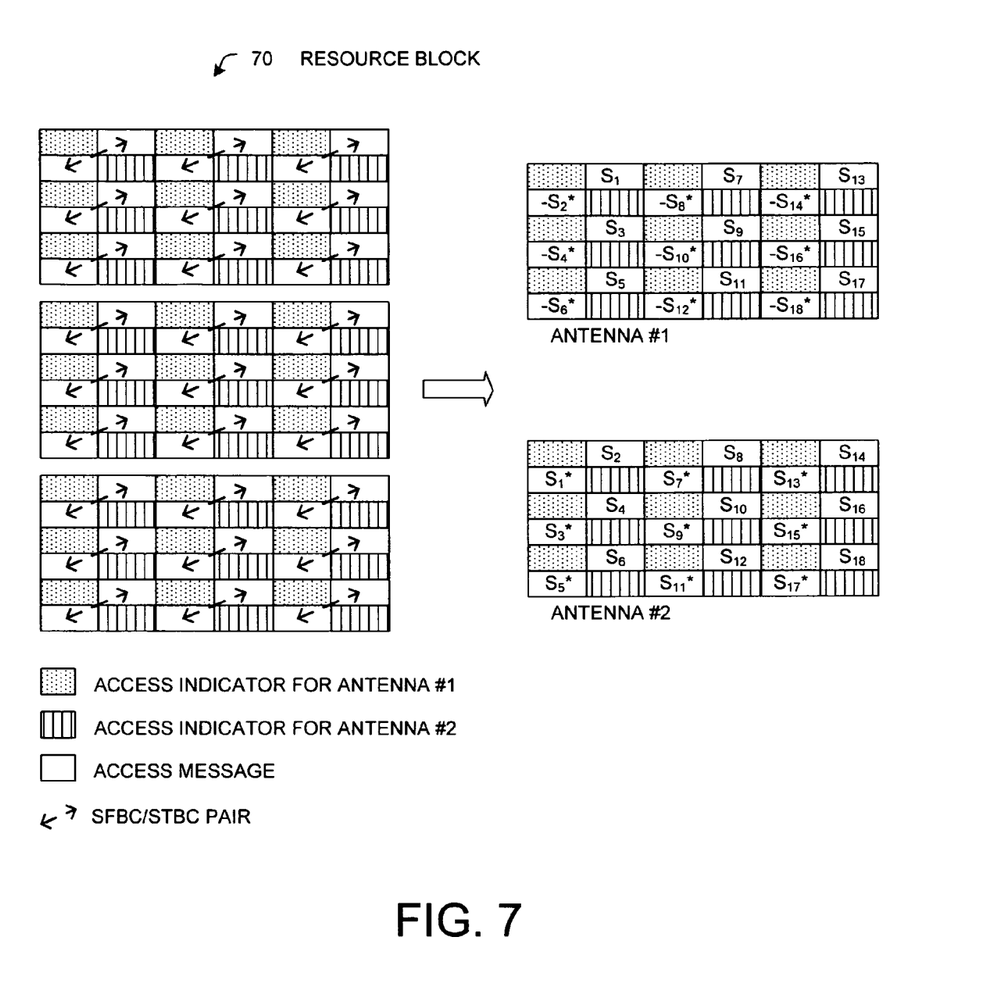
FIG. 7 illustrates one embodiment of physical layer channel structure and SFBC/STBC encoding for access channel transmission over multiple antennas.

FIG. 7 illustrates one embodiment of PHY layer channel structure and SFBC/STBC encoding used for access channel transmission over multiple antennas. In the example of FIG. 7, two transmitting antennas (antenna #1 and antenna #2) are used to transmit an access request containing an access indicator and an access message using resource block 70. In order to apply SFBC/STBC encoding, the mixed scheme of PHY structure is used, where the access indicator and access message are mixed together physically within resource block 70. The access indicator is encoded using orthogonal, or quasi-orthogonal, or spreading code sequences, while the access message is encoded by SFBC/STBC encoding algorithm to obtain space diversity. In addition, Subcarriers tones for the access indicator are separated into multiple equal portions to be transmitted as preambles at antenna #1 and antenna #2. As a result, the access indicator can be exploited as pilots for MIMO channel estimation at the receiver side.

Figure 8:
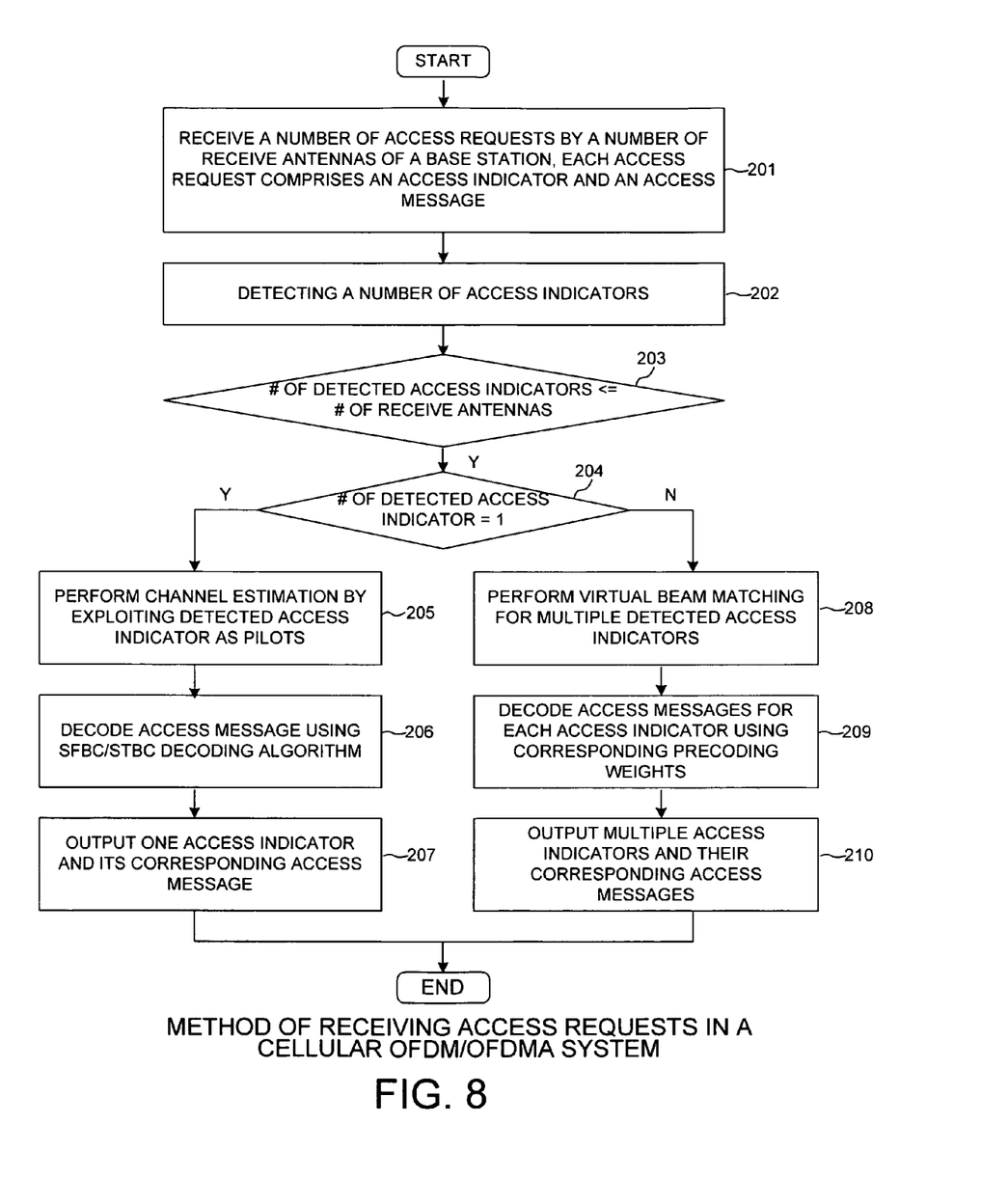
FIG. 8 is a flow chart of a first MIMO scheme in receiving access requests by a base station using multiple antennas with SFBC/STBC decoding.

FIG. 8 is a flow chart of the first MIMO scheme of receiving access requests by a base station using multiple antennas with SFBC/STBC decoding. The base station first receives a number of access requests by a number of receiving antennas (step 201). The access requests are transmitted from a number of mobile stations. Each access request comprises an access indicator and an access message. Because access indicators are transmitted as preambles, the base station first detects a number of access indicators from the received access requests (step 202). There are three possible decoding results depending upon the number of detected access indicators. In a first decoding scenario, the number of detected access indicators is larger than the number of receiving antennas. In a second decoding scenario, the number of detected access indicators is equal to one. In a third decoding scenario, the number of detected access indicators is less than or equal to the number of receiving antennas. Each of the three decoding results is explained below with more details.

In the first decoding scenario, if the number of detected access indicators is larger than the number of receiving antennas, then the access messages cannot be decoded correctly due to lack of degree of freedom. Under this scenario, if each mobile station sends its access request with different access indicators, then there is no collision among the access indicators and each mobile station retransmits only the access messages. On the other hand, if some of the mobile stations send their access requests with the same access indicator, then the access indicator collides among those mobile stations. The colliding mobile stations retransmit the entire access requests, while other non-colliding mobile stations retransmit only the access messages.

In the second decoding scenario, if the number of detected access indicators is equal to one, then a single access indicator and its corresponding access message may be outputted by the base station. Under this scenario, if only one mobile station sends one access request, then the access message can be decoded correctly. For example, the base station first performs channel estimation by exploiting the detected access indicator as pilots (step 205). The base station then decodes the access message using SFBC/STBC decoding algorithm (step 206). Finally, the base station outputs the detected access indicator and its corresponding access message (step 207). The access request succeeds and full diversity gain is obtained. On the other hand, if multiple mobile stations send their access requests with the same access indicator, then the access indicator collides among the mobile stations. As a result, access messages for the colliding mobile stations cannot be decoded correctly. The colliding mobile stations thus retransmit the entire access requests.

In the third decoding scenario, if the number of detected access indicators is less than or equal to the number of receiving antennas, then multiple access indicators and their corresponding access messages may be outputted by the base station. Under this scenario, if each mobile station sends its access request with different access indicators, then there is no collision among the access indicators and each access message can be decoded. For example, the base station first performs virtual beam matching based on the detection results of the access indicators detected by a Maximum Likelihood (ML) detector (step 208). The base station then decodes each access message by searching for the best vector weight for each access indicator (step 209). Finally, the base station outputs the detected access indicators and their corresponding access messages (step 210). Each of the access requests succeeds and beamforming gain is obtained. On the other hand, if some of the mobile stations send their access requests with the same access indicator, then the access indicator collides among those mobile stations. As a result, access messages for those colliding mobile stations cannot be decoded correctly. The colliding mobile stations thus retransmit the entire access requests.

Figure 9:
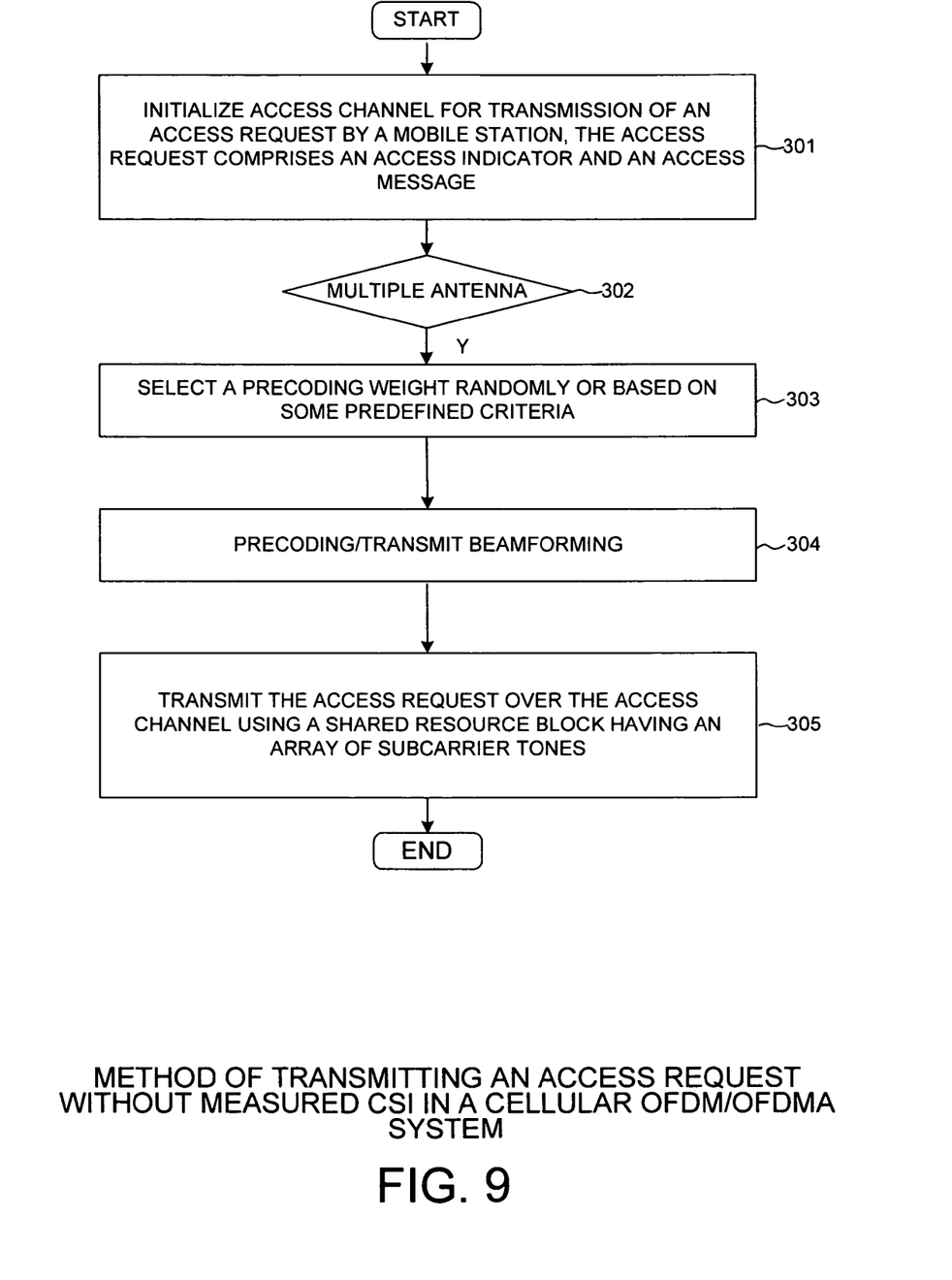
FIG. 9 is a flow chart of a second MIMO scheme in transmitting an access request by a mobile station using multiple antennas with precoding/beamforming technique when there is no measured CSI available.

FIG. 9 is a flow chart of the second MIMO scheme of transmitting an access request by a mobile station using multiple antennas with precoding/beamforming technique when there is no measured channel state information (CSI) available. The mobile station first initializes an access channel for transmitting an access request (step 301). The access request comprises an access indicator (i.e., a BR ranging code) and an access message (i.e., a BW-REQ message). The access indicator and the access message may be carried using either the mixed scheme of PHY structure or the separate scheme of PHY structure. When multiple antennas are utilized for transmission (step 302), the mobile station chooses a precoding/beamforming weight purely randomly, or based on some predefined criteria such as the location of the sensors in space and the wave direction of interest (step 303). Then, the mobile station performs precoding/beamforming for each of the utilized transmitting antennas by the selected precoding/beamforming weight (step 304). Finally, the mobile station transmits the access request over the initialized access channel using multiple transmitting antennas (step 305).

Figure 10:
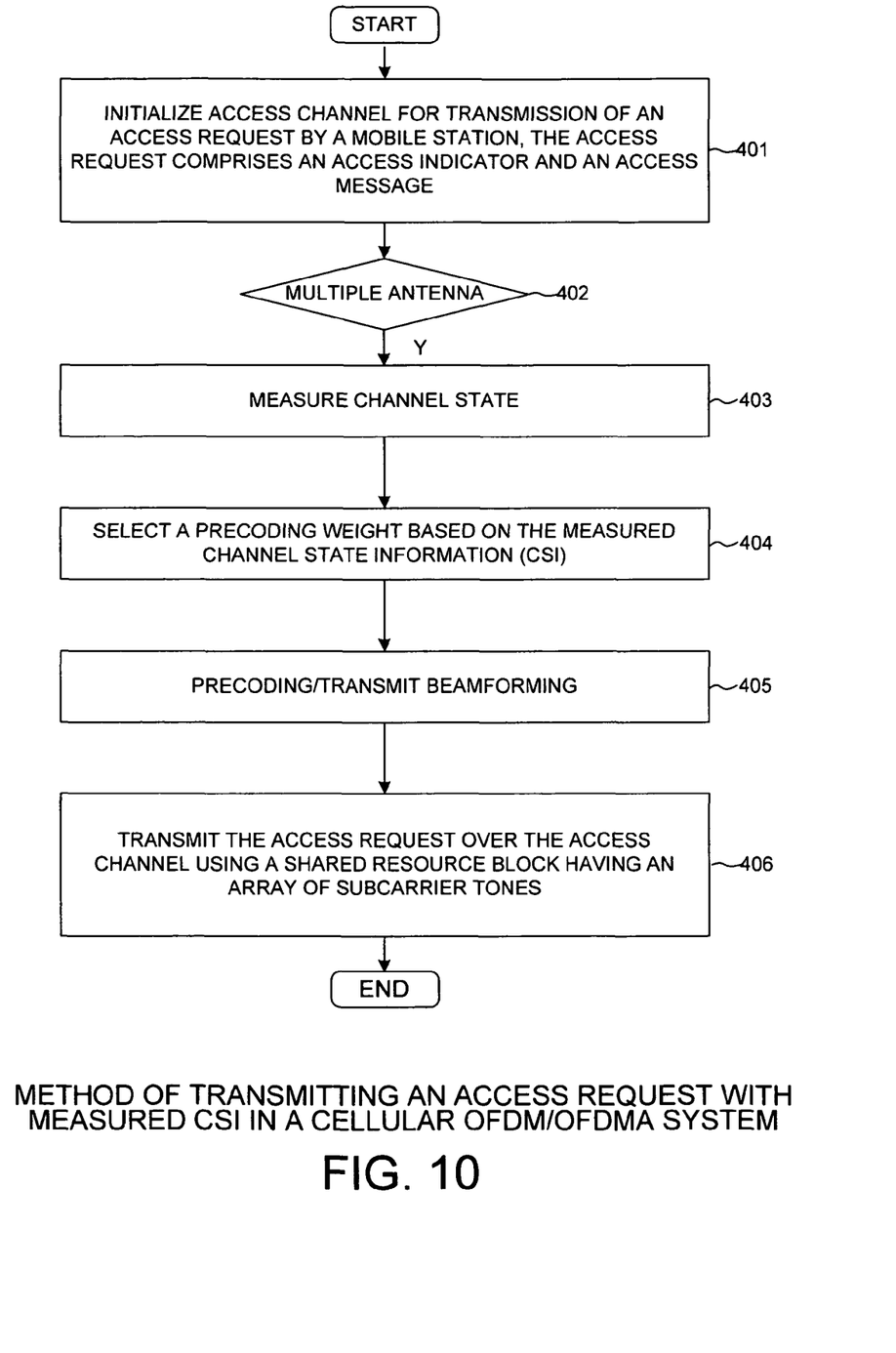
FIG. 10 is a flow chart of a second MIMO scheme in transmitting an access request by a mobile station using multiple antennas with precoding/beamforming technique when there is measured CSI available.

FIG. 10 is a flow chart of the second MIMO scheme of transmitting an access request by a mobile station using multiple antennas with precoding/beamforming technique when there is measured channel state information (CSI) available. The mobile station first initializes an access channel for transmitting an access request (step 401). The access request comprises an access indicator (i.e., a BR ranging code) and an access message (i.e., a BW-REQ message). The access indicator and the access message maybe carried using either the mixed scheme of PHY structure or the separate scheme of PHY structure. When multiple antennas are utilized for transmission (step 402), the mobile station measures the CSI (step 403) and selects a precoding/beamforming weight based on the measure CSI (step 404). In step 405, the mobile station performs precoding/beamforming for each of the utilized transmitting antennas by the selected precoding/beamforming weight. Finally, the mobile station transmits the access request over the initialized access channel using multiple transmitting antennas (step 406).

Figure 11:
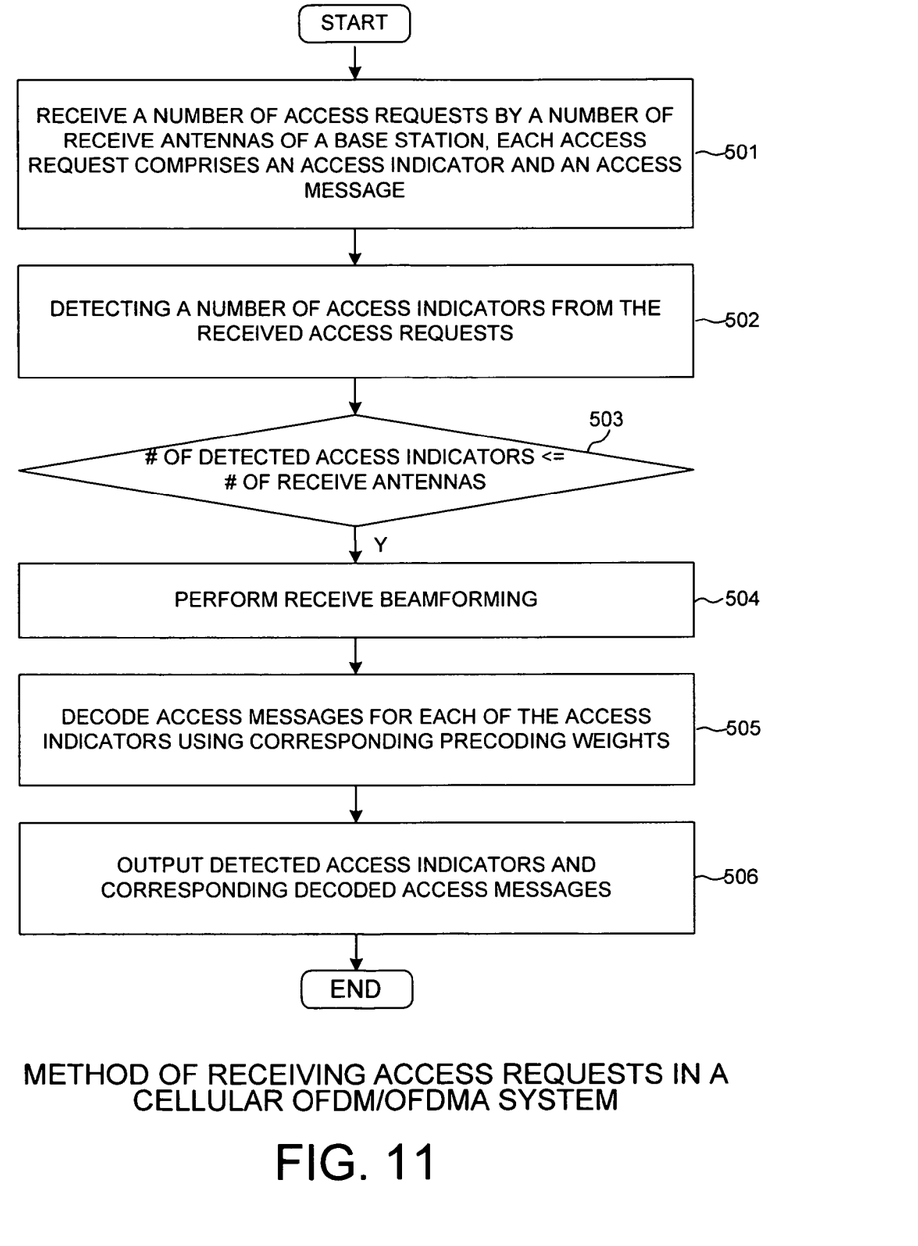
FIG. 11 is a flow chart of a second MIMO scheme in receiving access requests by a base station using multiple antennas with precoding/beamforming technique.

FIG. 11 is a flow chart of the second MIMO scheme of receiving access requests by a base station using multiple antennas with precoding/beamforming technique. The base station first receives a number of access requests by a number of receiving antennas (step 501). The access requests are transmitted from a number of mobile stations. Each access request comprises an access indicator and an access message. In step 502, the base station first detects a number of access indicators from the received access requests. There are two possible decoding results depending upon the number of detected access indicators. In a first decoding scenario, the number of detected access indicators is larger than the number of receiving antennas. In a second decoding scenario, the number of detected access indicators is less than or equal to the number of receiving antennas. Each of the two decoding results is explained below with more details.

In the first decoding scenario, if the number of detected access indicators is larger than the number of receiving antennas, then the access messages cannot be decoded correctly due to lack of degree of freedom. Under this scenario, if each mobile station sends its access request with different access indicators, then there is no collision among the access indicators and each mobile station retransmits only the access messages. On the other hand, if some of the mobile stations send their access requests with the same access indicator, then the access indicator collides among those mobile stations. The colliding mobile stations retransmit the entire access requests, while other non-colliding mobile stations retransmit only the access messages.

In the second decoding scenario, if the number of detected access indicators is less than or equal to the number of receiving antennas, then multiple access indicators and their corresponding access messages may be outputted by the base station. Under this scenario, if each mobile station sends its access request with different access indicators, then there is no collision among the access indicators and each access message can be decoded. For example, the base station first performs virtual beam matching based on the detection results of the access indicators detected by a Maximum Likelihood (ML) detector (step 504). The base station then decodes each access message by the best vector weight for each access indicator (step 505). Finally, the base station outputs the detected access indicators and their corresponding access messages (step 506). On the other hand, if some of the mobile stations send their access requests with the same access indicator, then the access indicator collides among those mobile stations. Referring back to FIG. 5, by utilizing both transmit beamforming and receive beamforming, some access messages can be decoded correctly for the mobile stations with high probability and for access messages that pass CRC check. As a result, the colliding mobile stations except the one whose access requests are decoded correctly retransmit their access requests.

Figure 12:
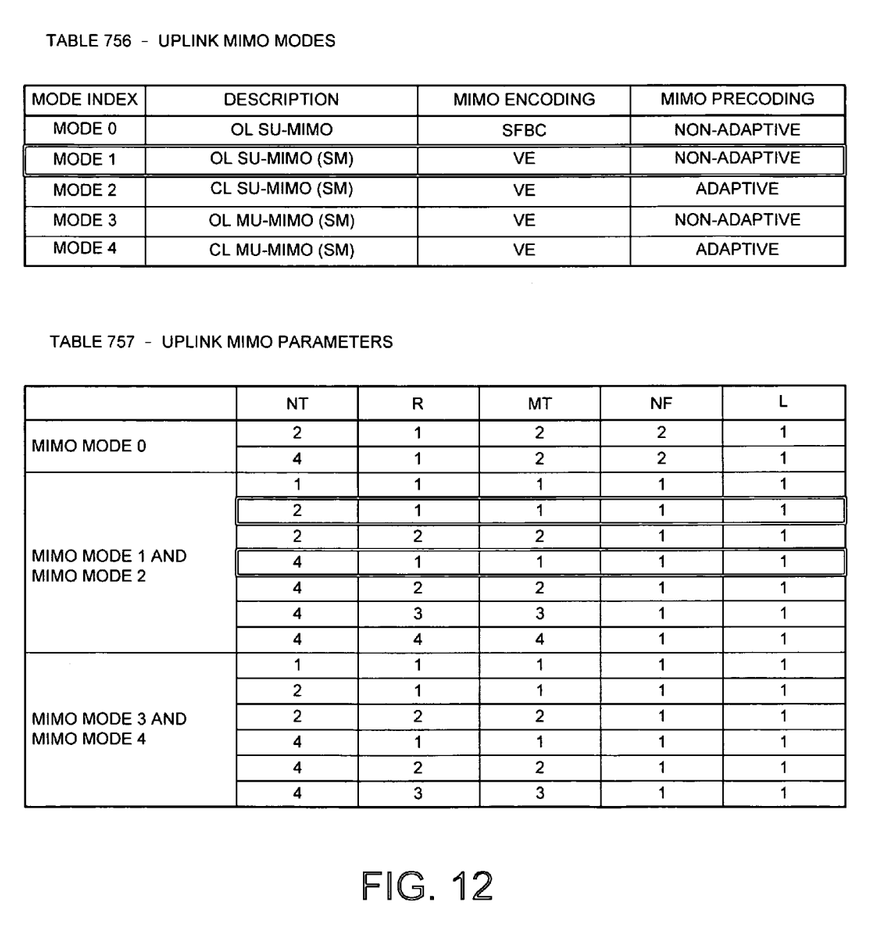
FIG. 12 illustrates uplink MIMO modes and MIMO parameters defined under IEEE 802.16m standard.

FIG. 12 illustrates uplink MIMO modes and MIMO parameters defined under the IEEE 802.16m standard. As illustrated in Table 756 of FIG. 12, there are five MIMO modes from mode0 to mode4. For each MIMO mode, different sets of MIMO parameters are further defined in Table 757 of FIG. 12. Among the five MIMO modes, mode1 is adopted by the IEEE 802.16m standard for uplink multi-antenna transmission of BW-REQ messages. MIMO mode1 is a single-user MIMO with vertical encoding and non-adaptive precoding. In addition, uplink MIMO parameters are further limited to 1-stream MIMO for uplink multi-antenna transmission of BW-REQ messages.

Although the present invention has been described in connection with certain specific embodiments for instructional purposes, the present invention is not limited thereto. For example, although BW-REQ ranging channel is used to describe the invention, the invention may be applied to other contention-based access channels. Accordingly, various modifications, adaptations, and combinations of various features of the described embodiments can be practiced without departing from the scope of the invention as set forth in the claims.

What is claimed is:

1. A method comprising:
   utilizing at least two antennas for transmitting an access request by a mobile station, wherein the mobile station transmits the access request over an access channel using a multiple-input multiple-output (MIMO) scheme in a cellular orthogonal frequency division multiplexing (OFDM) or orthogonal frequency division multiple access (OFDMA) system;
   selecting a corresponding weight via a precoding/beamforming scheme for each of the antennas utilized for transmitting the access request; and
   transmitting the access request that comprises both an access indicator for initial access and an access message for resource allocation over the access channel using a shared resource block.

2. The method of claim 1, wherein the access channel is a contention-based shared channel that comprises at least one of an initial ranging channel, a handover ranging channel, a bandwidth request channel, and a periodic ranging channel.

3. The method of claim 1, wherein the precoding/beamforming weight is selected from a predefined codebook based on Channel State Information (CSI) measured by the mobile station.

4. The method of claim 1, wherein the precoding/beamforming weight is either randomly selected or based on predefined criteria.

5. The method of claim 1, wherein the access indicator and access message are partitioned and mixed together within the resource block.

6. The method of claim 1, wherein the access indicator and access message are allocated in separate regions within the resource block.

7. A method comprising:
   receiving one or more access requests by a number of receive antennas of a base station, wherein each access request comprises one access indicator and one access message transmitted from a corresponding mobile station in a cellular orthogonal frequency division multiplexing (OFDM) or orthogonal frequency division multiple access (OFDMA) system;
   detecting a number of access indicators from the received one or more access requests;
   performing virtual beam searching and thereby obtaining corresponding precoding weights for each of the detected access indicators if the number of receive antennas is larger than or equal to the number of detected access indicators; and
   decoding access messages for each of the detected access indicators using corresponding precoding weights.

8. The method of claim 7, wherein the base station does not decode any access message if the number of receive antennas is smaller than the number of detected access indicators.

9. The method of claim 7, wherein a first mobile station sends a first access request having an access indicator and a first access message, wherein a second mobile station sends a second access request having the same access indicator and a second access message, and wherein the base station decodes one of the two access messages.

10. The method of claim 7, wherein the virtual beam searching is based on a predefined codebook.

11. A method comprising:
    utilizing at least two antennas for transmitting an access request by a mobile station, wherein the mobile station transmits the access request over an access channel in a cellular orthogonal frequency division multiplexing (OFDM) system, wherein the access request comprises both an access indicator for initial access and an access message for resource allocation;
    encoding the access indicator using orthogonal or spreading code sequences while applying space frequency block coding (SFBC) and/or space time block coding (STBC) on the access message for each of the utilized antennas; and
    transmitting the encoded streams of the access request over the access channel using a shared resource block having an array of subcarrier tones.

12. The method of claim 11, wherein the array of subcarrier tones in the access channel that carries the access indicator are separated into multiple equal portions to be transmitted by each of the utilized antennas.

13. The method of claim 11, wherein the access indicator and access message are partitioned and mixed together within the resource block.

14. The method of claim 13, wherein the access indicator is employed as pilots for channel estimation.

15. The method of claim 11, wherein the access indicator is selected from a group of access indicators for multi-antenna transmission.

16. The method of claim 11, wherein more than two antennas are utilized for access channel transmission, the method further comprising:
    applying a corresponding precoding/beamforming weight on the SFBC/STBC encoded streams for each of the utilized antennas.

17. A method comprising:
    receiving one or more access requests by a number of receive antennas of a base station, wherein each access request comprises one access indicator for initial access and one access message for resource allocation transmitted from a corresponding mobile station in a cellular orthogonal frequency division multiplexing (OFDM) or orthogonal frequency division multiple access (OFDMA) system;
    detecting a number of access indicators transmitted as preambles from the received one or more access requests;
    performing channel estimation by exploiting the detected access indicators as pilots if the number of detected access indicators is equal to one; and
    decoding an access message for the detected access indicator using space frequency block coding (SFBC) and/or space time block coding (STBC) decoding algorithm.

18. The method of claim 17, wherein the base station does not decode any access message if the number of receive antennas is smaller than the number of detected access indicators.

19. The method of claim 17, wherein the number of receive antennas is larger than or equal to the number of detected access indicators, and wherein the number of detected access indicators is larger than one, the method further comprising:
- performing virtual beam searching and thereby obtaining corresponding precoding/beamforming weights for each of the detected access indicators; and
- decoding access messages for each of the detected access indicator using corresponding precoding/beamforming weights.

20. The method of claim 19, wherein the virtual beam searching is based on a predefined codebook.

* * * * *